Dec. 28, 1954
G. F. WICHMANN ET AL
2,698,006
PRESSURE FLUID SERVOMOTOR
Filed Sept. 11, 1953
2 Sheets-Sheet 2
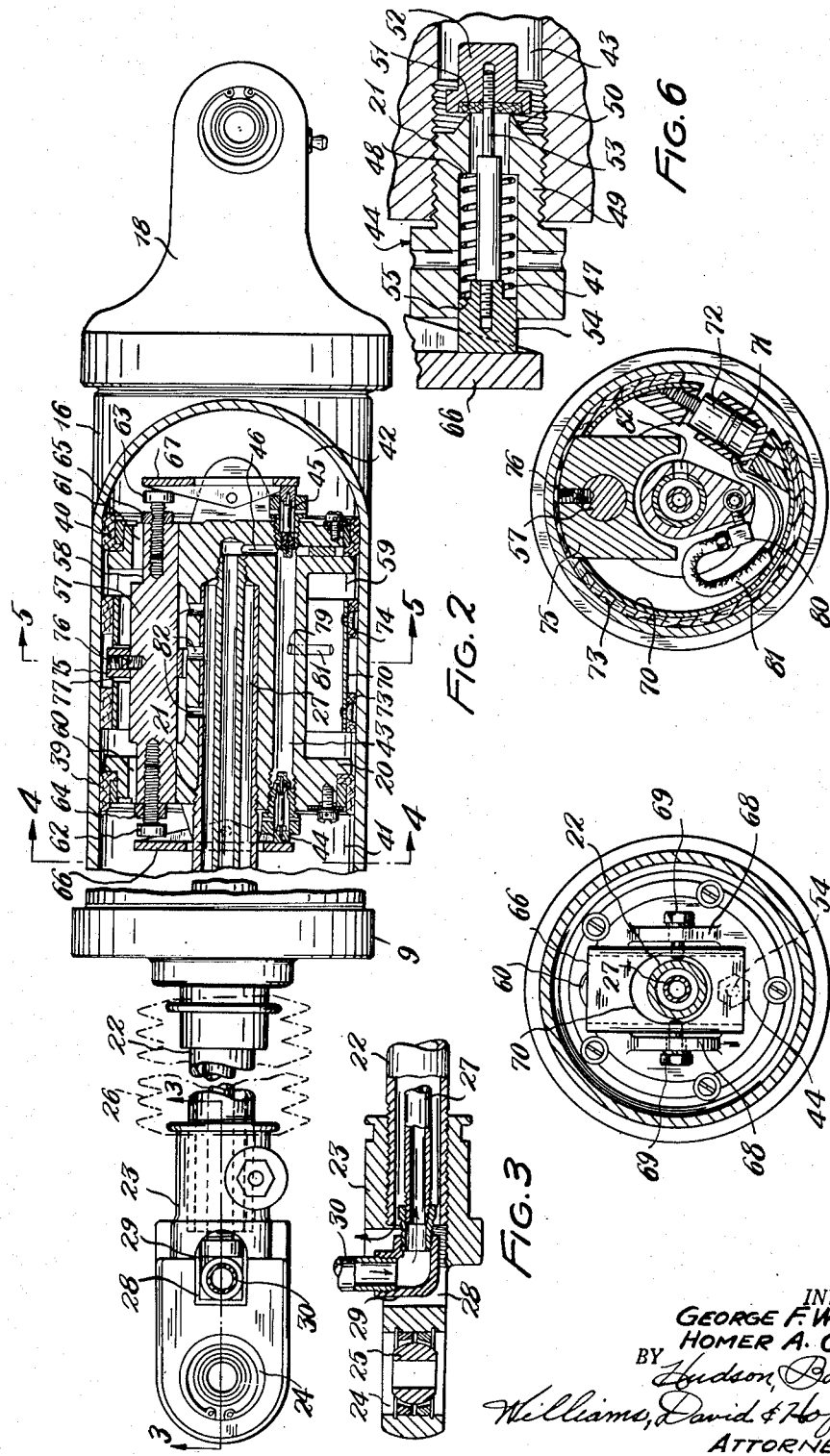
INVENTORS
GEORGE F. WICHMANN
HOMER A. GRAY
BY
Hudson, Boughton,
Williams, David & Hoffmann
ATTORNEYS United States Patent Office 2,698,006
Patented Dec. 28, 1954

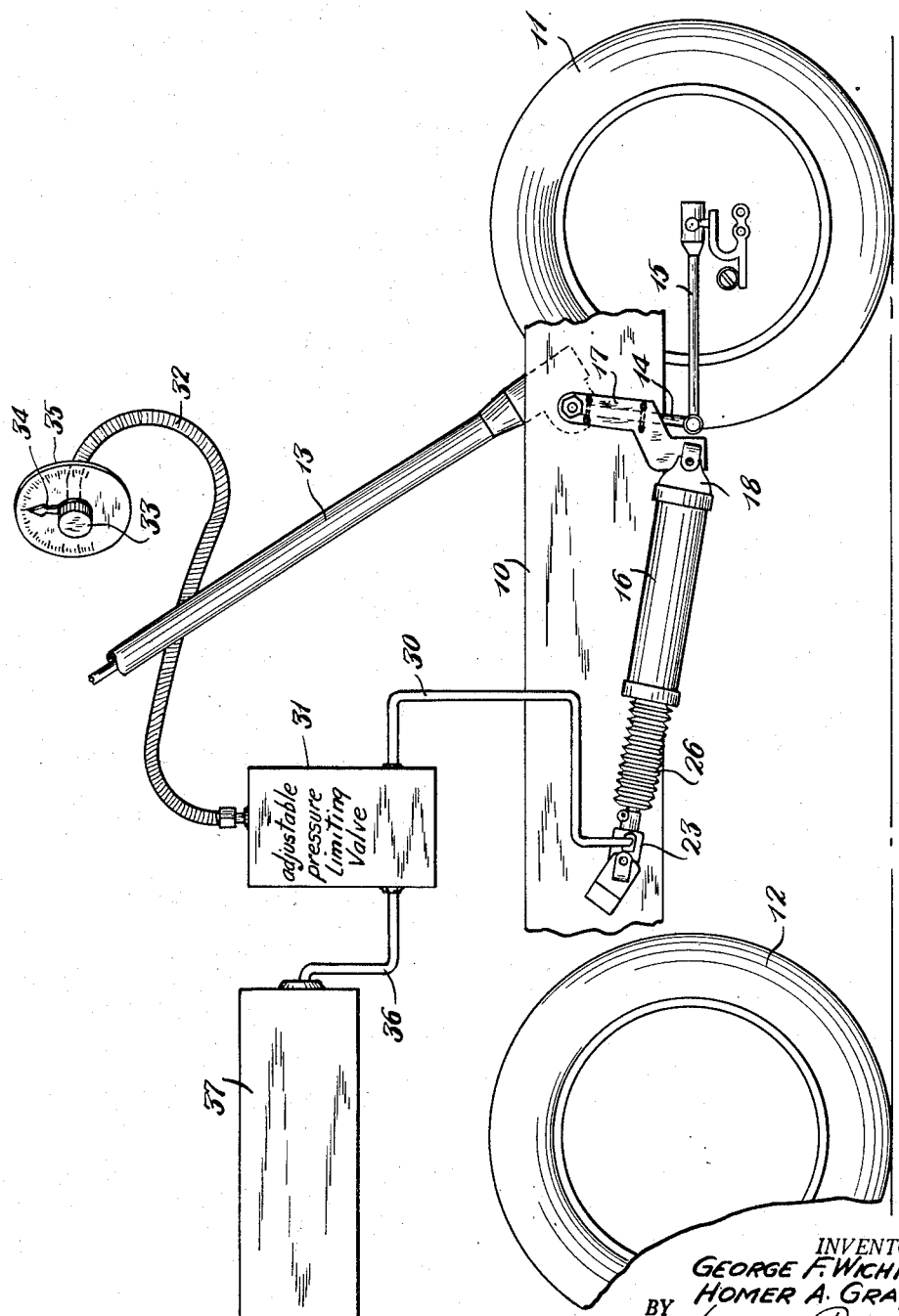

2,698,006
PRESSURE FLUID SERVOMOTOR

George F. Wichmann, Shaker Heights, and Homer A. Gray, Macedonia, Ohio, assignors to Air-O-Matic Power Steer Corporation, Cleveland, Ohio, a corporation of Ohio Application September 11, 1953, Serial No. 379,702

6 Claims. (Cl. 121—41)

This invention relates to improvements in power boosters, that is to say expansible devices operated by fluid pressure and so connected and actuated as to assist an operator in the performance of a manual operation. The invention in its broader aspects is applicable to a wide variety of uses.

As disclosed herein the invention is illustrated as applied to an automotive vehicle to assist in the steering of the vehicle, and in fact to take the major part of the steering load when the operator so desires.

On the straightaway over a smooth pavement no great effort is required to hold even a heavy vehicle to its course, and under such circumstances it is advisable for reasons of safety to reduce the booster effect materially. This may be done by placing an adjustable pressure limiting valve in the fluid pressure system within easy reach of the driver. On the other hand when proceeding slowly in traffic and when making sharp turns the assistance to steering resulting from utilizing fairly heavy booster pressure is very helpful and very much appreciated, and at such times the pressure limiting valve may be opened to a selected extent.

In power booster mechanism of the type employed in our invention it is highly important that the mechanism respond instantly to the control exerted by the driver of the vehicle through his operation of the steering wheel, and also that this response be equally good for any part of the fluid pressure available as selected by his operation of the pressure limiting valve.

The said type of booster mechanism embodies a friction brake carried by a bar slidable in the piston, the brake tending at the moment of steering operation to engage the inner wall of the cylinder and cause the bar to move with the cylinder momentarily, which movement operates valve means to produce flow of pressure fluid into the cylinder chamber at one end of the piston and flow of exhaust fluid from the chamber within the cylinder at the opposite end of the piston. The action of this valve means must be very sensitive if good steering action is to result. It cannot be thus sensitive throughout the range of pressures which may be selected by the pressure limiting valve unless the force setting the brake is available instantly and is proportional to the pressure being used.

One of the objects of the present invention therefore is the provision of means for automatically effecting a setting of the brake by a force which is directly proportional to the selected pressure in the pressure fluid system.

Another object is the provision of a fluid motor for setting the brake which motor is connected at all times directly with the pressure fluid supply, that is to say independently of the booster valve means, whereby the proper brake setting is effected and maintained before the slide bar which controls the valve means starts its movement, and before pressure begins to build up in the chamber at one end of the cylinder.

Another object is the provision of a flexible hose connection or its equivalent between the pressure fluid supply and the fluid motor which sets the brake, in order that relative motion between the slide bar and the piston may be accommodated.

Other objects and features of novelty will appear as we proceed with the description of that embodiment of the invention which, for the purposes of the present application, we have illustrated in the accompanying drawings, in which Fig. 1 is a diagrammatic side elevational view showing the invention applied to a motor vehicle having a fluid pressure system in which there is a pressure limiting valve;

Fig. 2 is an elevational view of the booster mechanism, portions of the cylinder and piston being shown in section in order to more clearly illustrate the invention;

Fig. 3 is a detail sectional view showing the fluid intake and exhaust connections at the outer end of the hollow piston rod, the view being taken substantially on the line 3—3 of Fig. 2;

Figs. 4 and 5 are detail sectional views taken substantially on the lines 4—4 and 5—5 of Fig. 2; and Fig. 6 is a longitudinal sectional view on a larger scale of one of a pair of poppet valves employed in connection with the invention.

Referring first to Fig. 1, 10 is applied to a portion of a vehicle chassis having a pair of front wheels 11 and a pair of rear wheels 12. 13 is a steering wheel post at the upper end of which there is a conventional steering wheel, not shown, which serves to institute movement of a pitman 14 and a link 15 constituting parts of a steering mechanism of conventional form. The cylinder 16 of our booster mechanism is connected to some part of the steering mechanism to receive motion therefrom. For example a plate 17 may be clamped to pitman 14, as indicated in the drawing and this plate may be pivotally connected with the head 18 at the forward end of the cylinder 16.

A spool shaped piston 20 is slidable within cylinder 16 and is attached by means of threads 21 or other suitable means to a hollow piston rod 22 which extends through the inner head 9 of the cylinder, the sliding joint being sealed by suitable packing, not shown. At the outer end of piston rod 22 there is threadably mounted a casting or forging 23 having a terminal opening 24 in which is universally mounted a sleeve 25 to receive a pivot carried by the chassis. A bellows 26 may be attached to the cylinder head 9 and the casting 23 to enclose the exposed portion of the piston rod and protect it from dampness, dust and dirt.

Axially disposed within the hollow piston rod 22 there is a tube 27, the inner end of which is attached to the piston by a threaded connection or otherwise. Its outer end extends into an opening 28 in the casting 23 where it is attached to an elbow fitting 29 which receives a conductor 30 that is part of the fluid pressure system of the vehicle. Live fluid is therefore supplied to the booster through the tube 27. Conductor 30, as indicated in Fig. 1, may extend to a conventional pressure limiting valve diagrammatically indicated at 31 and controlled by a flexible shaft 32 extending to a knob 33 having a pointer 34 which may be manually rotated over a dial 35 conveniently positioned for operation by the driver of the vehicle. From the measuring valve 31 a conductor 36 may extend to a pressure fluid tank or reservoir 37. Preferably this is a compressed air tank, but it may be a tank for other gaseous or liquid pressure fluid, including fluid under negative pressure or vacuum.

The spool shaped piston at its ends carries packings 39 and 40 which engage the inner wall of the cylinder and seal the space 59 surrounding the constricted middle portion of the piston from the spaces or chambers 41 and 42 within the cylinder outwardly of the piston. 43 is a fluid passage extending entirely through the piston but normally closed at its ends by poppet valves 44 and 45. This passage is always in communication with the live fluid supply through a bored passage 46 which connects with the inner end of tube 27. Each of these poppet valves is biased toward closed position as indicated in Fig. 6 by a coil spring 47 which bears at one end against a shoulder 48 formed in a threaded block 49 set into the end of the passage 43. The part 49 carries a circular seat 50 against which a gasket 51 is adapted to bear. Gasket 51 is mounted in a valve piece 52 that is threaded to a valve stem 53 on the opposite end of which there is a head 54 having a shoulder 55 against which the opposite end of spring 47 abuts. Spring 47 holds the valve closed except when pressure is exerted against head 54 to force the valve toward the right against the pressure of the spring.

A slide bar 57, preferably of round cross-section, is mounted to project through openings in the end portions of the spool shaped piston. At both ends this bar is relieved as at 58, so when the bar is in its mid position, shown in Fig. 2, the intermediate space 59 between the ends of the piston is in communication with the chambers 41 and 42. However, when the slide bar is shifted sufficiently in one direction or the other the unrelieved central portion of the slide bar closes off one or the other of the passages 60 and 61 for a purpose which will presently appear. In the ends of the slide bar 57 there are threaded bores which receive headed screws 62 and 63 which may be adjusted inwardly or outwardly and locked in adjusted position by nuts 64 and 65. These screws 62 and 63 are adapted to bear against levers 66 and 67 which are pivotally mounted intermediate their ends on piston extensions. Referring to Fig. 4, such extensions are shown at 68 carrying pivot pins 69 which extend into holes in side flanges of the lever 66, the latter having an opening 70 therethrough to clear the hollow piston rod 22. At its lower end this lever abuts against the head 54 of the adjacent poppet valve 44. If the slide bar 57 is shifted to the left, screw 62 will engage lever 66 and move it counterclockwise, causing its lower end to engage head 54 on the valve and open the valve against the force of spring 47. Within the space 59 between the ends of the piston there is an expanding brake band 70. Between the ends of the brake band there is mounted a fluid motor comprising a cylinder 71 attached to one end of the brake band and a piston 72 attached to the other end. On the outer surface of the brake band 70 and along the edges thereof there are riveted two strips of brake lining 73 and 74 for engagement with the inner surface of the cylinder. A block 75 surrounds bar 57 midway of its length, these two parts being secured together by a setscrew 76. Block 75 is received within a slot 77 formed in brake band 70, so that any movement of the band lengthwise of the booster is transmitted to the slide bar 57 and vice versa.

In the intermediate body portion of the piston there is a threaded hole 79 which extends into passage 43. In this hole there is mounted a fitting 80 to which is connected a flexible hose connection 81 leading to the cylinder 71 of the fluid motor. By this means the passage 43 which is always connected with the pressure fluid supply is continuously connected with the fluid motor 71, 72, so that at all times the brake is set by pressure which is directly proportional to the pressure in the pressure system as determined by the pressure limiting valve 31.

The annular space within the hollow piston rod 22 and surrounding the tube 27 constitutes an exhaust passage, and this passage is in communication at all times through ports 82 with the intermediate space 59 which is in communication with one or both of the cylinder chambers 41 and 42. Hence, when the piston is in its normal position illustrated in Fig. 2, the pressure supply is sealed off by the poppet valves 44 and 45 and the cylinder chambers 41 and 42 are exhausted through the passages 60 and 61, the intermediate space 59, ports 82 and the annular passage through the hollow piston rod.

The operation of the invention will be described in connection with its application to an automotive vehicle as a steering booster. Assuming that the driver desires to make a turn in a direction calling for the swinging of the pitman 14 toward the right, as viewed in Fig. 1, he turns the steering wheel in the proper direction through a small angle. This pulls cylinder 16 to the right. The brake being set at the time by a force proportional to the selected pressure in the system, adheres to this cylinder wall and causes slide bar 57 to move to the right. Screw 63 then contacts lever 67 and moves it clockwise sufficiently to open valve 45, which causes pressure fluid to be discharged into chamber 42. This movement of the slide bar closes the exhaust passage 61 but exhaust passage 60 remains open, thereby preventing any interference with the desired action by pressure which might otherwise be set up in chamber 41. Pressure builds up rapidly in chamber 42 to produce relative movement between the piston and cylinder which exerts the desired booster effect.

As soon as the pressure in chamber 42 builds up it will act on the end of slide bar 57 with sufficient force to shift it and the brake back toward the left far enough to open passage 61 slightly and close valve 45, which will reduce the pressure in chamber 42 slightly below that of the pressure system as controlled by valve 31 and enable the fluid motor to set the brake, since the pressure in the fluid motor is constant and always equal to the maximum available. Now if further turning movement is desired the operator maintains a slight additional effort tending to draw cylinder 16 forward. The brake and slide bar 57 will again move forward opening valve 45 and closing exhaust passage 61. These actions will be repeated in rapid sequence until the desired result is accomplished. Of course operation of the steering wheel to institute a turn in the opposite direction produces an opposite movement of slide bar 57, opening valve 44 through the intermediacy of lever 66 and closing exhaust passage 60, which causes pressure to build up rapidly in chamber 41 while exhaust passage 61 remains open to prevent any build-up of pressure in chamber 42.

Normally pressure in the passage 43 is maintained equal to that available in the conductor 30 as controlled by valve 31. When the device is idle the pressure in chambers 41 and 42 is atmospheric, those chambers being connected through intermediate space 59 and ports 82 with the annular space surrounding tube 27 which is in communication through the outer end of the hollow piston rod with atmosphere, as illustrated in Fig. 3.

If driving conditions render it desirable, the operator may shift knob 33 in one direction or the other to regulate the pressure transmitted through the pressure limiting valve 31, which will change the pressure in the conductor 30 and in the booster. This change of available pressure will immediately vary the force exerted by the fluid motor 71, 72 and the degree of pressure exerted by the brake against the cylinder wall. In every case this insures the best possible braking effect for the particular fluid pressure being used in the booster, and from this ideal condition there results booster operation which is extremely sensitive and which produces steering control that is instantaneously responsive to the operator's handling of the steering wheel.

Having thus described our invention, we claim:

1. In a fluid operated booster, a cylinder closed at its ends, a spool shaped piston therein, a piston rod extending through one end of said cylinder, means for connecting the outer ends of the cylinder and piston rod between a relatively fixed element and a movable element to the movement of which the booster effect is to be applied, a slidable bar extending through said piston in an eccentric position, an expanding brake attached to said slidable bar and disposed between the ends of said spool shaped piston for engagement with the inner wall of said cylinder, a fluid motor for expanding said brake, a live fluid conductor in said piston rod connected at the outer end thereof with a fluid pressure system, means actuated by the movement of said slide bar relative to the piston in one direction for connecting said live fluid conductor to the cylinder chamber beyond one end of said piston to create a booster effect, means under control of said slide bar for exhausting fluid from the cylinder chamber beyond the opposite end of said piston, and means effective in all positions of said slide bar for maintaining communication between said live fluid conductor and said fluid motor, whereby the force operating said fluid motor for setting said brake is directly proportional at all times to the pressure available in said fluid pressure system.

2. A fluid operated booster as defined in claim 1, wherein said fluid motor is carried by said brake and said means for maintaining communication between said live fluid conductor and said fluid motor comprises a flexible hose connection.

3. In a fluid operated booster, a cylinder closed at its ends, a spool shaped piston therein, a piston rod extending through one end of said cylinder, means for connecting the outer ends of the cylinder and piston rod between a relatively fixed element and a movable element to the movement of which the booster effect is to be applied, a slidable bar extending through said piston in an eccentric position, an expanding brake attached to said bar for engagement with the inner wall of said cylinder, a fluid motor carried by said brake for expanding the same, said piston having a longitudinal fluid passage extending entirely therethrough, a valve at each end of said passage, means actuated by the movement of said slide bar relative to the piston in one direction for opening one of said valves and in the opposite direction for opening the other of said valves, a live fluid conductor in said piston rod connected at the outer end thereof with a fluid pressure system, means for connecting said live fluid conductor at all times with said fluid passage and a conductor from said passage to said fluid motor effective in all positions of said slide bar, whereby the force setting said brake at any given instant of booster operation is directly proportional to the pressure available in the fluid pressure system.

4. In a fluid operated booster, a cylinder closed at its ends, a spool shaped piston therein, a piston rod extending through one end of said cylinder, means for connecting the outer ends of the cylinder and piston rod between a relatively fixed element and a movable element to the movement of which the booster effect is to be applied, a slidable bar extending through said piston in an eccentric position, an expanding brake attached to said bar for engagement with the inner wall of said cylinder, a fluid motor carried by said brake for expanding the same, said piston having a longitudinal fluid passage extending entirely therethrough, a valve at each end of said passage, means actuated by the movement of said slide bar in one direction relative to the piston for opening one of said valves and in the opposite direction for opening the other of said valves, a live fluid conductor in said piston rod connected at the outer end thereof with a fluid pressure system, means for connecting said live fluid conductor at all times with said fluid passage and a flexible hose connection from said passage to said fluid motor, whereby the force setting said brake at any given instant of booster operation is directly proportional to the pressure available in the fluid pressure system.

5. A power booster substantially as defined in claim 3, wherein said conductor from said fluid passage to said fluid motor extends outwardly from said fluid passage through the space within the cylinder between the ends of said spool shaped piston and thence directly to said fluid motor, whereby the flow of pressure fluid to said fluid motor is independent of said slide bar.

6. In a fluid operated booster for vehicle steering mechanism, a cylinder closed at its ends, a spool shaped piston therein, a piston rod extending through one end of said cylinder, means for connecting the outer ends of the cylinder and piston rod between a vehicle chassis and one of its steering connections, a slidable bar extending through said piston in an eccentric position, an expanding brake attached to said slidable bar and disposed between the ends of said spool shaped piston for engagement with the inner wall of said cylinder, a fluid pressure supply, an outer conductor for transmitting pressure fluid from said supply to said booster, an adjustable pressure limiting valve in said outer conductor, a live fluid conductor in said piston rod connected at the outer end thereof with said outer conductor, a fluid motor for expanding said brake, means actuated by the movement of said slide bar relative to the piston in one direction for connecting said live fluid conductor to the cylinder chamber beyond one end of said piston to create a booster effect, means under control of said slide bar for exhausting fluid from the cylinder chamber beyond the opposite end of said piston, and means effective in all positions of said slide bar for maintaining communication between said live fluid conductor and said fluid motor, whereby the force operating said fluid motor for setting said brake is directly proportional at all times to the pressure available in said pressure system as selected by said adjustable pressure limiting valve.

References Cited in the file of this patent

UNITED STATES PATENTS

| Number | Name | Date |
| --- | --- | --- |
| 2,392,772 | Schneider | Jan. 8, 1946 |